(12) United States Patent
Okimoto et al.

(10) Patent No.: US 11,231,552 B2
(45) Date of Patent: Jan. 25, 2022

(54) PHOTO DETECTOR AND METHOD FOR PRODUCING PHOTO DETECTOR

(71) Applicant: SUMITOMO ELECTRIC INDUSTRIES, LTD., Osaka (JP)

(72) Inventors: Takuya Okimoto, Osaka (JP); Hideki Yagi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/150,791

(22) Filed: Jan. 15, 2021

(65) Prior Publication Data

US 2021/0223476 A1  Jul. 22, 2021

(30) Foreign Application Priority Data

Jan. 21, 2020 (JP) .............................. JP2020-007562

(51) Int. Cl.
    *G02B 6/26* (2006.01)
    *G02B 6/12* (2006.01)
    *G02B 6/293* (2006.01)

(52) U.S. Cl.
    CPC ......... *G02B 6/266* (2013.01); *G02B 6/12019* (2013.01); *G02B 6/2935* (2013.01)

(58) Field of Classification Search
    CPC ... G02B 6/266; G02B 6/12019; G02B 6/2935
    USPC ....................................................... 385/140
    See application file for complete search history.

(56) References Cited

U.S. PATENT DOCUMENTS

| | | | |
|---|---|---|---|
| 2003/0180030 A1* | 9/2003 | Hirose ..................... | G02B 6/12 385/147 |
| 2007/0065088 A1* | 3/2007 | Tanaka .................... | G02F 1/225 385/140 |
| 2011/0139107 A1* | 6/2011 | Burrows ................. | H01T 13/18 123/169 EL |
| 2011/0142393 A1* | 6/2011 | Earnshaw ............ | G02B 6/3594 385/14 |
| 2016/0094015 A1* | 3/2016 | Hashimoto ............. | H01S 5/125 372/45.012 |
| 2017/0038543 A1* | 2/2017 | Sugiyama .............. | G02B 6/122 |

OTHER PUBLICATIONS

Runge, Patrick, et al., Monolithic InP Receiver Chip With a Variable Optical Attenuator for Colorless WDM Detection, *IEEE Photonics Technology Letters*, vol. 26, No. 4, Feb. 15, 2014, p. 349-p. 351.

* cited by examiner

*Primary Examiner* — Jerry M Blevins
(74) *Attorney, Agent, or Firm* — Smith, Gambrell & Russell, LLP.

(57) ABSTRACT

A photo detector includes a variable optical attenuator provided on a substrate, an optical 90-degree hybrid device provided on the substrate, and a plurality of photodiodes provided on the substrate. The plurality of photodiodes are optically coupled to the variable optical attenuator via the optical 90-degree hybrid device. The variable optical attenuator includes an optical waveguide disposed on the substrate, a heater configured to heat the optical waveguide, and an insulating layer at least partially disposed between the substrate and the optical waveguide.

17 Claims, 12 Drawing Sheets

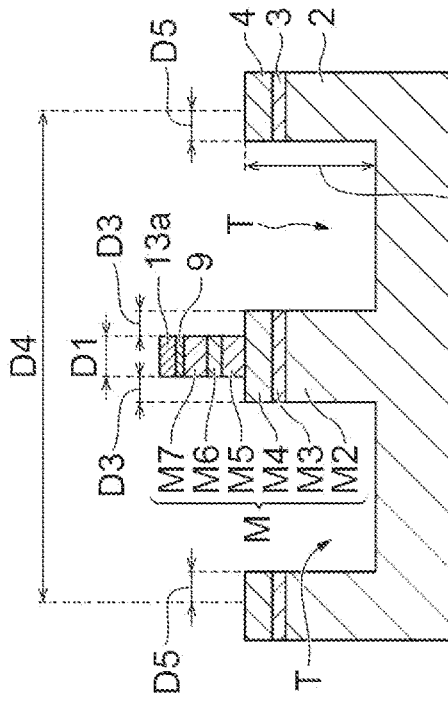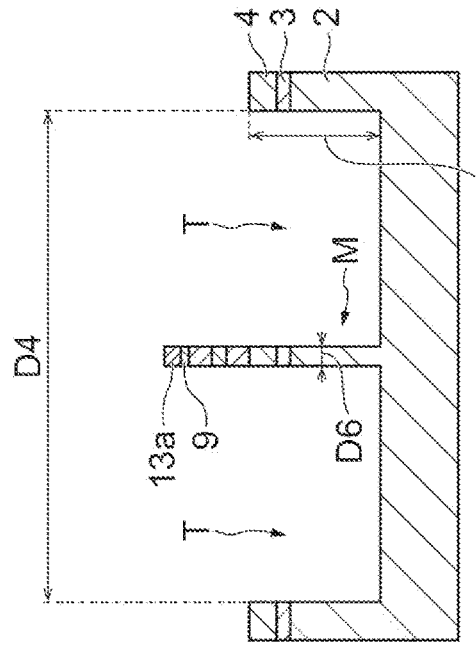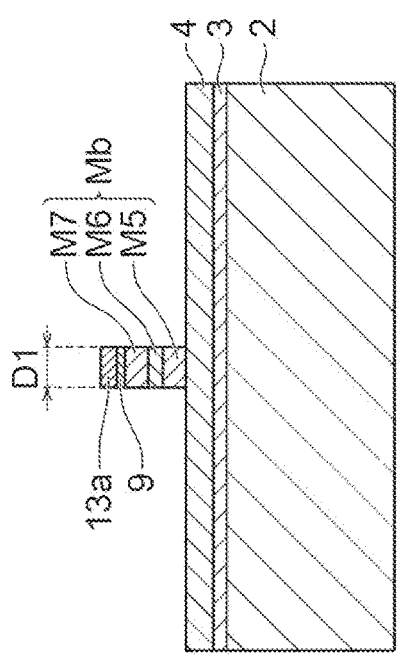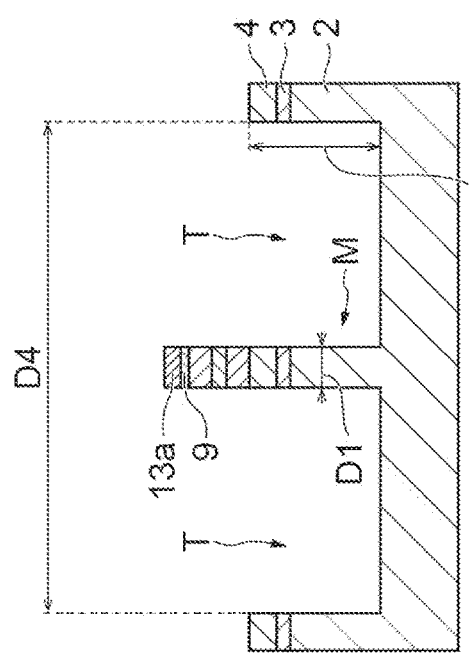

PHOTO DETECTOR AND METHOD FOR PRODUCING PHOTO DETECTOR

CROSS REFERENCE TO RELATED APPLICATIONS

This application claims priority based on Japanese Patent Application No. 2020-007562 filed on Jan. 21, 2020, and the entire contents of which are incorporated herein by reference.

TECHNICAL FIELD

The present disclosure relates to a photo detector and a method for producing a photo detector.

BACKGROUND

Non Patent Document 1 (Patrick Runge et al., "Monolithic InP Receiver Chip With a Variable Optical Attenuator for Colorless WDM Detection", IEEE PHOTONICS TECHNOLOGY LETTERS, VOL. 26, NO. 4, Feb. 15, 2014) discloses a photo detector in which a variable optical attenuator, an optical 90-degree hybrid device, and a plurality of photodiodes are monolithically integrated on an InP substrate. The variable optical attenuator has a heater provided on one arm waveguide of two arm waveguides.

SUMMARY

A photo detector according to an aspect of the present disclosure includes a variable optical attenuator provided on a substrate, an optical 90-degree hybrid device provided on the substrate, and a plurality of photodiodes provided on the substrate. The plurality of photodiodes are optically coupled to the variable optical attenuator via the optical 90-degree hybrid device, and the variable optical attenuator includes an optical waveguide provided on the substrate, a heater configured to heat the optical waveguide, and an insulating layer at least partially disposed between the substrate and the optical waveguide.

A method for producing a photo detector according to another aspect of the present disclosure is a method for producing a photo detector including a variable optical attenuator provided on a substrate, an optical 90-degree hybrid device provided on the substrate, and a plurality of photodiodes provided on the substrate. The plurality of photodiodes are optically coupled to the variable optical attenuator via the optical 90-degree hybrid device. The method includes forming a first semiconductor layer for an insulating layer on an area of a main surface of the substrate for forming the variable optical attenuator, forming a second semiconductor layer for an optical waveguide of the variable optical attenuator on the first semiconductor layer, and forming a heater configured to heat the optical waveguide on the second semiconductor layer.

BRIEF DESCRIPTION OF THE DRAWINGS

The foregoing and other purposes, aspects and advantages will be better understood from the following detailed description of a preferred embodiment of the invention with reference to the drawings.

FIGS. 8A to 8D are drawings showing simulated models of a variable optical attenuator.

DETAILED DESCRIPTION

Figure 1:
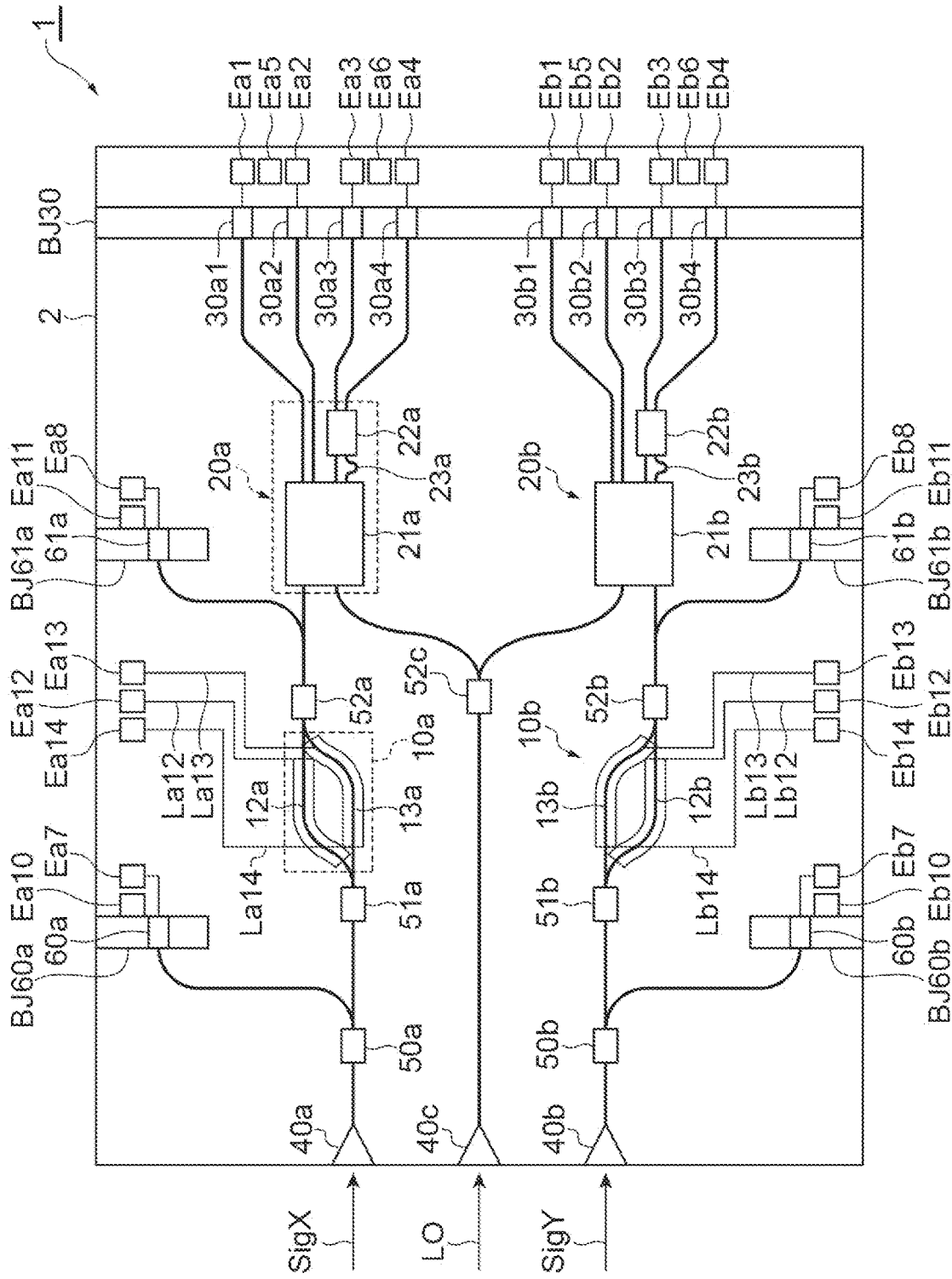
FIG. 1 is a plan view schematically showing a photo detector according to an embodiment.

According to the photo detector of Non-Patent Document 1, when the arm waveguide of the variable optical attenuator is heated by the heater, heat dissipates from the arm waveguide to the InP-substrate. Therefore, the energy supplied to the heater to heat the arm waveguide is increased.

The present disclosure provides a method for producing a photo detector and photo detector that can reduce the energy supplied to a heater to heat an optical waveguide.

Description of Embodiments of the Present Disclosure

A photo detector according to an embodiment includes a variable optical attenuator provided on a substrate, an optical 90-degree hybrid device provided on the substrate, and a plurality of photodiodes provided on the substrate. The plurality of photodiodes are optically coupled to the variable optical attenuator via the optical 90-degree hybrid device, and the variable optical attenuator includes an optical waveguide provided on the substrate, a heater configured to heat the optical waveguide, and an insulating layer at least partially disposed between the substrate and the optical waveguide.

According to the photo detector, when the optical waveguide is heated by the heaters, heat transfer from the optical waveguide to the substrates is suppressed by the insulating layer. Therefore, it is possible to reduce the energy supplied to the heater to heat the optical waveguide.

The insulating layer may include a semiconductor portion. In this case, the optical waveguide can then be physically supported by the semiconductor portion.

The insulating layer may include a void portion. In this case, the thermal insulation of the insulating layer is improved as compared with the case where the insulating layer is filled with a heat insulating material.

The insulating layer may include the semiconductor portion and the void portion, and the semiconductor portion and the void portion may be alternately arranged along the optical waveguide. In this case, the optical waveguide can then be physically supported by the semiconductor portion. In addition, the void portion increases the thermal insulation of the insulating layer.

The thickness of the insulating layer may be 300 nm or less. When the thickness of the insulating layer is 300 nm or less, the possibility that the insulating layer functions as a core layer can be reduced.

The insulating layer may extend along the optical waveguide and may terminate between the variable optical attenuator and the optical 90-degree hybrid device. In this instance, no insulating layer is placed between the substrate and the optical 90-degree hybrid device. Therefore, it is possible to suppress the deterioration of the heat dissipation from the optical 90-degree hybrid device to the substrate.

The substrate may comprise a main surface including a first region and a second region adjacent to the first region. The optical waveguide may be provided on the first region. A trench may be formed in the second region. In this case, when viewed from the normal direction of the main surface of the substrate, the heat transfer toward the second region from the first region is suppressed by the trench. Therefore, it is possible to further reduce the energy supplied to the heater to heat the optical waveguide.

The optical waveguide and the insulating layer may be included in a mesa provided on the substrate. In this instance, the heat of the optical waveguide and the insulating layer are confined within the mesa. Therefore, it is possible to further reduce the energy supplied to the heater to heat the optical waveguide.

A method for producing a photo detector according to another embodiment is a method for producing a photo detector including a variable optical attenuator provided on a substrate, an optical 90-degree hybrid device provided on the substrate, and a plurality of photodiodes provided on the substrate. The plurality of photodiodes are optically coupled to the variable optical attenuator via the optical 90-degree hybrid device. The method includes forming a first semiconductor layer for an insulating layer on an area of the main surface of the substrate for forming the variable optical attenuator, forming a second semiconductor layer for an optical waveguide of the variable optical attenuator on the first semiconductor layer, and forming a heater configured to heat the optical waveguide on the second semiconductor layer.

According to the method for producing the above photo detector, the insulating layer at least partially disposed between the optical waveguide of the variable optical attenuator and the substrate can be formed. As a result, when the optical waveguide is heated by the heater, heat transfer from the optical waveguide to the substrates is suppressed by the insulating layer. Therefore, it is possible to reduce the energy supplied to the heater to heat the optical waveguide.

Details of Embodiments of the Present Disclosure

Hereinafter, embodiments according to the present disclosure will be described in detail with reference to the drawings. In the description of the drawings, like or corresponding elements are denoted by like reference numerals and redundant descriptions thereof will be omitted.

Photo Detector

FIG. 1 is a plan view schematically showing a photo detector according to an embodiment. A photo detector 1 shown in FIG. 1 is used for coherent light communication, for example. The photo detector 1 includes variable optical attenuators (VOAs) 10a and 10b provided on a substrate 2, optical 90-degree hybrid devices 20a and 20b provided on the substrate 2, and a plurality of photodiodes 30a1 to 30a4 and 30b1 to 30b4 provided on the substrate 2. The variable optical attenuators 10a and 10b, the optical 90-degree hybrid devices 20a and 20b, and the plurality of photodiodes 30a1 to 30a4 and 30b1 to 30b4 are monolithically integrated on the substrate 2.

The plurality (e.g., four) of the photodiodes 30a1 to 30a4 are optically coupled to the variable optical attenuator 10a via the optical 90-degree hybrid device 20a. Each of the plurality of the photodiodes 30a1 to 30a4 is connected to the optical 90-degree hybrid device 20a by an optical waveguide. The optical 90-degree hybrid device 20a is optically coupled to the variable optical attenuator 10a via an optical demultiplexer 52a such as a two-input-two-output multimode interference (MMI) coupler, for example. The variable optical attenuator 10a is optically coupled to a spot-size converter 40a via optical demultiplexers 50a and 51a such as one-input-two-output MMI couplers. The spot-size converter 40a is located at the end portion of the substrate 2.

The plurality (e.g., four) of the photodiodes 30b1 to 30b4 are optically coupled to the variable optical attenuator 10b via the optical 90-degree hybrid device 20b. Each of the plurality of the photodiodes 30b1 to 30b4 is connected to the optical 90-degree hybrid device 20b by an optical waveguide. The optical 90-degree hybrid device 20b is optically coupled to the variable optical attenuator 10b via an optical demultiplexer 52b such as a two-input-two-output MMI coupler. The variable optical attenuator 10b is optically coupled to a spot-size converter 40b via optical demultiplexers 50b and 51b such as one-input-two-output MMI couplers. The spot-size converter 40b is located at the end portion of the substrate 2.

The optical 90-degree hybrid devices 20a and 20b are optically coupled to a spot-size converter 40c via an optical demultiplexer 52c such as a one-input-two-output MMI coupler. The spot-size converter 40c is located at the end portion of the substrate 2.

The spot-size converter 40a acts as an input port to which a first signal light SigX is entered. The spot-size converter 40b acts as an input port to which a second signal light SigY is entered. The spot-size converter 40c acts as an input to which a local oscillation light LO is entered.

The first signal light SigX is, for example, an X-polarized wave having the same wavelengths and four phases that differ from each other. The second signal light SigY is, for example, a Y-polarized wave having the same wavelength and four phases that differ from each other. Each of the first signal light SigX and the second signal light SigY is a signal light modulated by a quadrature phase shift keying (QPSK) system, for example. Each of the first signal light SigX and the second signal light SigY is wavelength-multiplexed in various wavelength bands. The various wavelength bands include the C band (wavelength range of 1530 nm to 1565 nm) and the L band (wavelength range of 1565 nm to 1625 nm) in the ITU-T (International Telecommunication Union Telecommunication Standardization Sector), for example. The local oscillation light LO has the same wavelength as the respective wavelength of the first signal light SigX and the second signal light SigY, for example.

An output end of the spot-size converter 40a is connected to the input end of the optical demultiplexer 50a by an optical waveguide. The first output end of the optical demultiplexer 50a is connected by an optical waveguide to the input end of the optical demultiplexer 51a. The second output end of the optical demultiplexer 50a is connected to a photodiode 60a by an optical waveguide. The anode of the photodiode 60a is electrically connected to an electrode pad Ea7 via an anode electrode, for example. The cathode of the photodiode 60a is electrically connected to an electrode pad Ea10 via a cathode electrode, for example. The photodiode 60a monitors the magnitude of the first signal light SigX. The photodiode 60a is a PIN photodiode, for example. The photodiode 60a is located in the area BJ60a that defines butt joint bonding.

The first output end and the second output end of the optical demultiplexer 51a are connected to the input end of the variable optical attenuator 10a by an optical waveguide. The variable optical attenuator 10a is an optical attenuator of the Mach-Zehnder type, for example. The variable optical attenuator 10a includes heaters 12a and 13a configured to heat the first and second arm optical waveguides, respectively. The heaters 12a and 13a extend along the first and second arm optical waveguides, respectively. One end of the heater 12a is electrically connected to an electrode pad Ea12 by a conductive line La12. The other end of the heater 12a is electrically connected to an electrode pad Ea14 by a conductive line La14. One end of the heater 13a is electrically connected to an electrode pad Ea13 by a conductive line La13. The other end of the heater 13a is electrically connected to an electrode pad Ea14 by a conductive line La14. The output end of the variable optical attenuator 10a is connected to the input end of the optical demultiplexer 52a by an optical waveguide. The first output end of the optical demultiplexer 52a is connected by an optical waveguide to the first input end of the optical 90-degree hybrid device 20a. The second output end of the optical demultiplexer 52a is connected to a photodiode 61a by an optical waveguide. The anode of the photodiode 61a is electrically connected to an electrode pad Ea8 via an anode electrode, for example. The cathode of the photodiode 61a is electrically connected to an electrode pad Ea11 via a cathode electrode, for example. The photodiode 61a indirectly monitors the magnitude of the first signal light SigX outputted from the variable optical attenuator 10a by monitoring the optical attenuation in the variable optical attenuator 10a. The photodiode 61a is a PIN photodiode, for example. The photodiode 61a is located in the area BJ61a that defines butt joint bonding.

The optical 90-degree hybrid device 20a includes a 2-input-4-output MMI coupler 21a and a 2-input-2-output MMI coupler 22a, for example. The first input end of the MMI coupler 21a is the first input end of the optical 90-degree hybrid device 20a. The second input end of the MMI coupler 21a is the second input end of the optical 90-degree hybrid device 20a. Two output ends of the four output ends in the MMI coupler 21a are each coupled to the two input ends of the MMI coupler 22a via optical waveguides. The optical path lengths of these two optical waveguides are different from each other. In a phase shift portion 23a, one optical waveguide is curved away from the other optical waveguide so that one optical waveguide is slightly longer than the other optical waveguide. As a result, the signal component propagating in one optical waveguide has a delay corresponding to a phase of 45° with respect to the signal component propagating in the other optical waveguide. The other two output ends of the MMI coupler 21a are connected to the photodiodes 30a1 and 30a2 by optical waveguides, respectively. The anode of the photodiode 30a1 is electrically connected to an electrode pad Ea1. The cathode of the photodiode 30a1 is electrically connected to an electrode pad Ea5. The anode of the photodiode 30a2 are electrically connected to electrode pad Ea2. The cathode of the photodiode 30a2 is electrically connected to an electrode pad Ea5. Two output ends of the MMI coupler 22a are connected to photodiodes 30a3 and 30a4 by optical waveguides, respectively. The anode of the photodiode 30a3 is electrically connected to an electrode pad Ea3. The cathode of the photodiode 30a3 is electrically connected to an electrode pad Ea6. The anode of the photodiode 30a4 is electrically connected to an electrode pad Ea4. The cathode of the photodiode 30a4 is electrically connected to an electrode pad Ea6. The photodiodes 30a1 to 30a4 are located in the area BJ30 that defines butt joint bonding. The photodiodes 30a1 to 30a4 are PIN photodiodes, for example.

The output end of the spot-size converter 40b is connected to the input end of the optical demultiplexer 50b by an optical waveguide. The first output end of the optical demultiplexer 50b is connected to the input end of the optical demultiplexer 51b via an optical waveguide. The second output end of the optical demultiplexer 50b is connected to a photodiode 60b by an optical waveguide. The anode of the photodiode 60b is electrically connected to an electrode pad Eb7 via an anode electrode, for example. The cathode of the photodiode 60b is electrically connected to an electrode pad Eb10 via a cathode electrode, for example. The photodiode 60b monitors the magnitude of the second signal light SigY. The photodiode 60b is a PIN photodiode, for example. The photodiode 60b is located in the area BJ60b that defines butt joint bonding.

The first output end and the second output end of the optical demultiplexer 51b are connected to the input end of the variable optical attenuator 10b by optical waveguides. The variable optical attenuator 10b is an optical attenuator of the Mach-Zehnder type, for example. The variable optical attenuator 10b includes heaters 12b and 13b configured to heat the first and the second arm optical waveguides, respectively. The heaters 12b and 13b extend along the first and second arm optical waveguides, respectively. One end of the heater 12b is electrically connected to an electrode pad Eb12 by a wire Lb12. The other end of the heater 12b is electrically connected to an electrode pad Eb14 by a wire Lb14. One end of the heater 13b is electrically connected to an electrode pad Eb13 by a wire Lb13. The other end of the heater 13b is electrically connected to an electrode pad Eb14 by a wire Lb14. The output end of the variable optical attenuator 10b is connected to the input end of the optical demultiplexer 52b by an optical waveguide. The first output end of the optical demultiplexer 52b is connected to the first input end of the optical 90-degree hybrid device 20b by an optical waveguide. The second output end of the optical demultiplexer 52b is connected to a photodiode 61b by an optical waveguide. The anode of the photodiode 61b is electrically connected to an electrode pad Ebb via an anode electrode, for example. The cathode of the photodiode 61b is electrically connected to an electrode pad Eb11 via a cathode electrode, for example. The photodiode 61b indirectly monitors the magnitude of the second signal light SigY outputted from the variable optical attenuator 10b by monitoring the optical attenuation in the variable optical attenuator 10b. The photodiode 61b is a PIN photodiode, for example. The photodiode 61b is located in the area BJ61b that defines butt joint bonding.

The optical 90-degree hybrid device 20b includes, for example, a 2-input-4-output MMI coupler 21b and a 2-input-2-output MMI coupler 22b. The first input end of the MMI coupler 21b is the first input end of the optical 90-degree hybrid device 20b. The second input end of the MMI coupler 21b is the second input end of the optical 90-degree hybrid device 20b. Two output ends of the four output ends in the MMI coupler 21b are each coupled to two input ends of the MMI coupler 22b via optical waveguides.

The optical path lengths of these two optical waveguides are different from each other. In a phase shift portion 23b, one optical waveguide is curved away from the other optical waveguide so that one optical waveguide is slightly longer than the other optical waveguide. As a result, the signal component propagating in one optical waveguide has a delay corresponding to a phase of 45° with respect to the signal component propagating in the other optical waveguide. The other two output ends of the MMI coupler 21b are connected to the photodiodes 30b1 and 30b2 by optical waveguides, respectively. The anode of the photodiode 30b1 is electrically connected to an electrode pad Eb1. The cathode of the photodiode 30b1 is electrically connected to an electrode pad Eb5. The anode of the photodiode 30b2 is electrically connected to an electrode pad Eb2. The cathode of the photodiode 30b2 is electrically connected to an electrode pad Eb5. Two output ends of the MMI coupler 22b are connected to the photodiode 30b3 and 30b4 by optical waveguides, respectively. The anode of the photodiode 30b3 is electrically connected to an electrode pad Eb3. The cathode of the photodiode 30b3 is electrically connected to an electrode pad Eb6. The anode of the photodiode 30b4 is electrically connected to an electrode pad Eb4. The cathode of the photodiode 30b4 is electrically connected to an electrode pad Eb6. The photodiodes 30b1 to 30b4 are located in the area BJ30 that defines butt joint bonding. The photodiodes 30b4 to 30b1 are PIN photodiodes, for example.

The output end of the spot-size converter 40c is connected to the input end of the optical demultiplexer 52c by an optical waveguide. The first output end of the optical demultiplexer 52c is connected to the second input end of the optical 90-degree hybrid device 20a by an optical waveguide. The second output end of the optical demultiplexer 52c is connected to the second input end of the optical 90-degree hybrid device 20b by an optical waveguide.

According to the photo detector 1, the first signal light SigX input to the spot-size converter 40a is attenuated by the variable optical attenuator 10a. Thereafter, the first signal light SigX is input to the optical 90-degree hybrid device 20a along with the local oscillation light LO input to the spot-size converter 40c. The interference of the first signal light SigX and the local oscillation light LO in the optical 90-degree hybrid device 20a causes the first signal light SigX to be separated into four light components. The four light components are detected by the photodiodes 30a1 to 30a4, respectively. The light components detected by the photodiodes 30a1 and 30a2 are in-phase components I having phases that differs from each other by 180°. For example, the phase of the light component detected by the photodiode 30a1 is 0°. The phase of the light component detected by the photodiode 30a2 is 180°. The light components detected by the photodiodes 30a3 and 30a4 are quadrature-phase components Q having phases that differs from each other by 180° and are different from the phase of the in-phase components I by 90°. For example, the phase of the light component detected by the photodiode 30a3 is 90°. The phase of the light component detected by the photodiode 30a4 is 270°.

The second signal light SigY input to the spot-size converter 40b is attenuated by the variable optical attenuator 10b. Thereafter, the second signal light SigY is input to the optical 90-degree hybrid device 20b along with the local oscillation light LO input to the spot-size converter 40c. The interference between the second signal light SigY and the local oscillation light LO in the optical 90-degree hybrid device 20b causes the second signal light SigY to be separated into four light components, as in the case of the first signal light SigX. The four light components are detected by the photodiodes 30b4 to 30b1, respectively.

Figure 2:
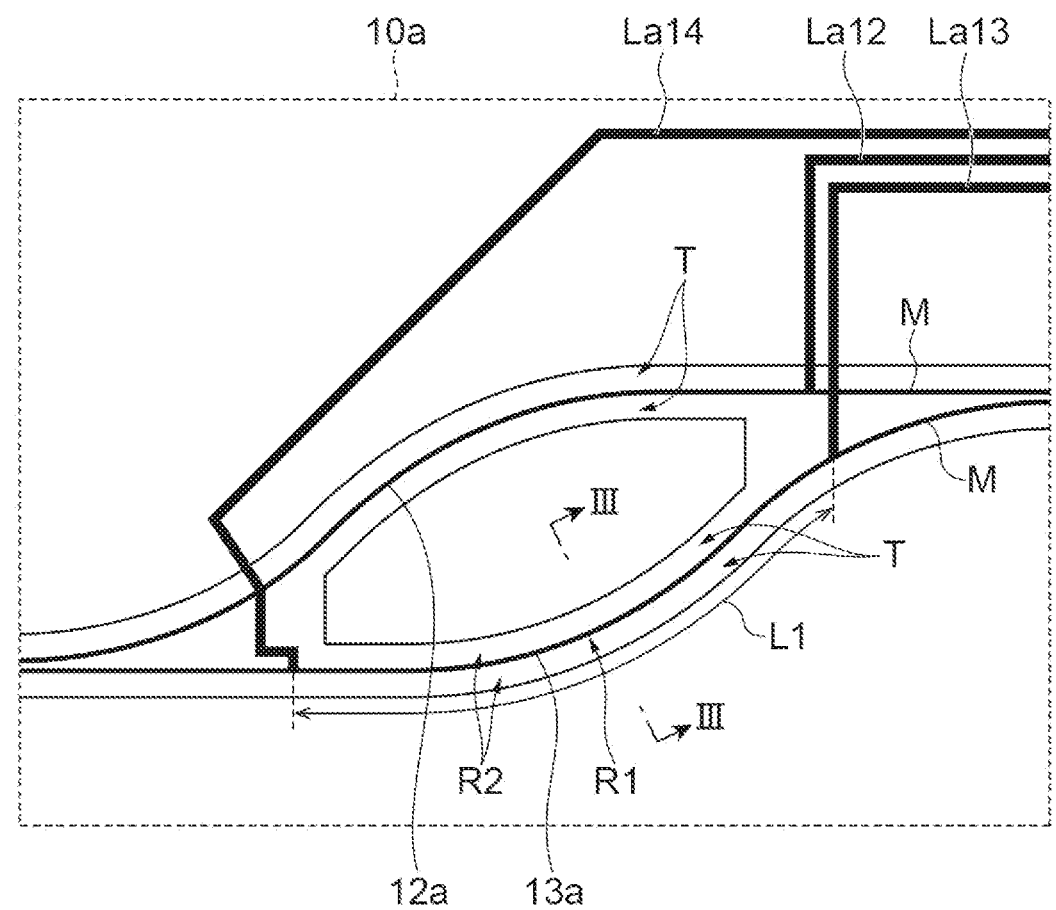
FIG. 2 is an enlarged view of a part of FIG. 1.
Figure 3:
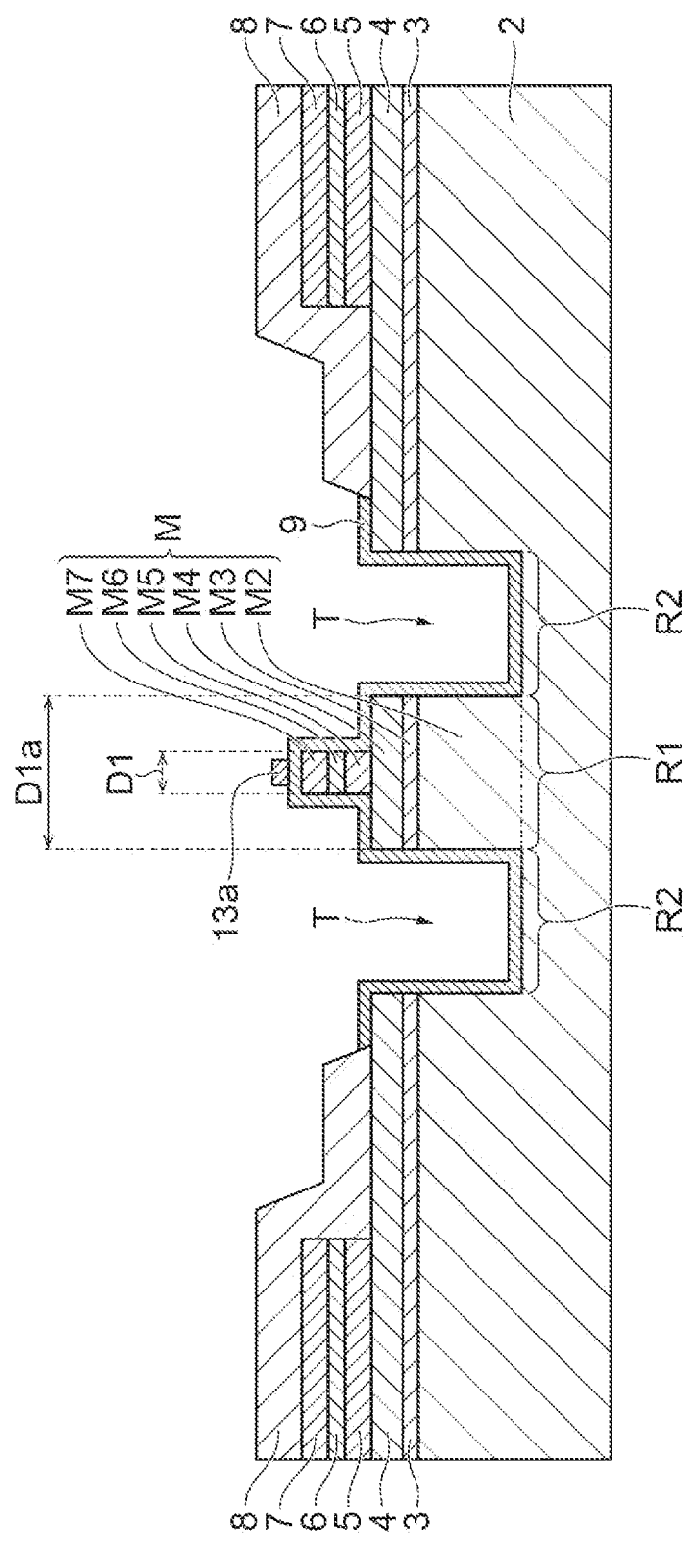
FIG. 3 is a cross-sectional view taken along III-III line of FIG. 2.
Figure 4:
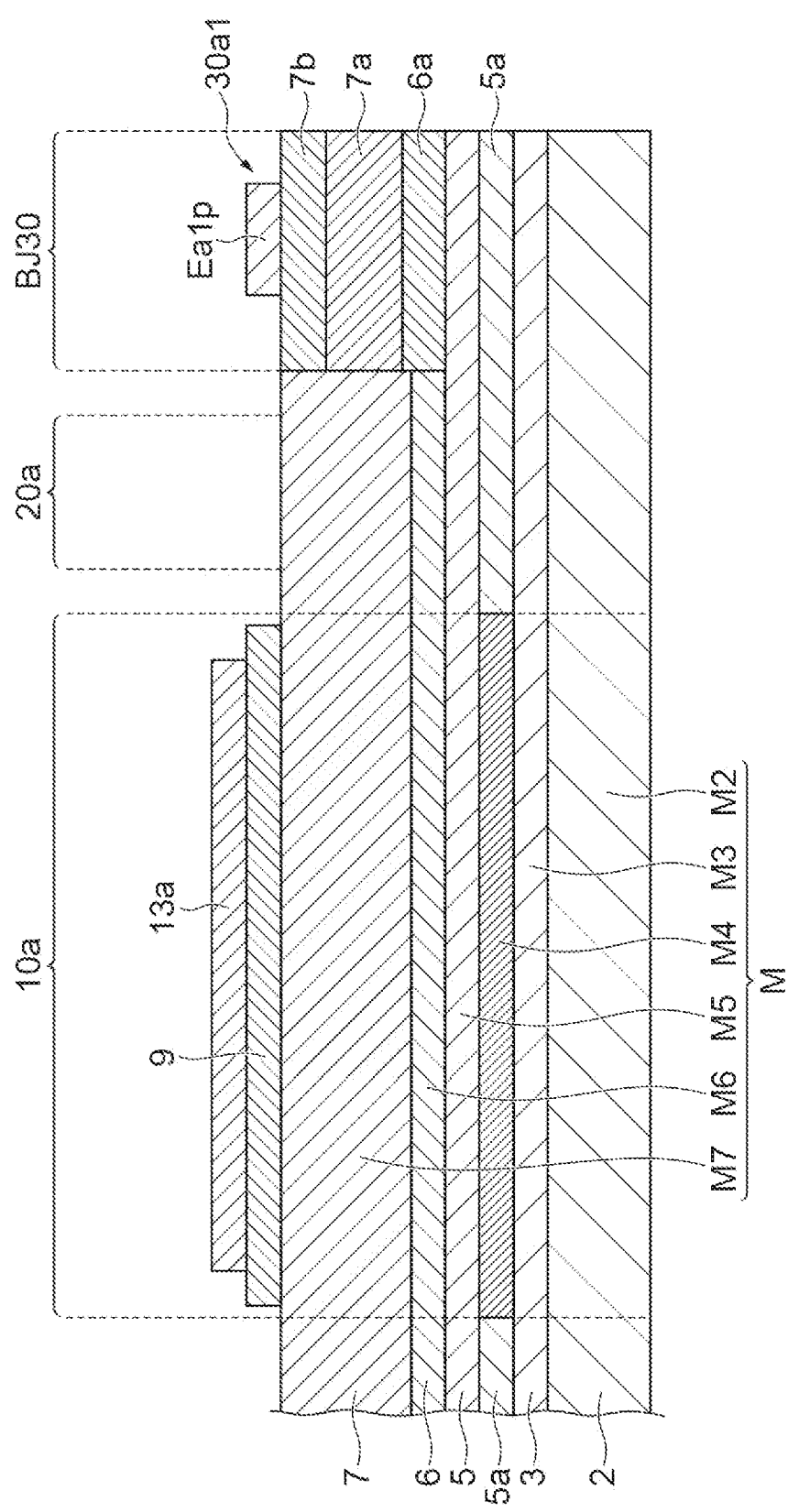
FIG. 4 is a cross-sectional view of a photo detector along an optical waveguide.

FIG. 2 is an enlarged view of the variable optical attenuator 10a of FIG. 1. FIG. 3 is a cross-sectional view taken along III-III line of FIG. 2. FIG. 4 is a cross-sectional view of a photo detector along an optical waveguide. The variable optical attenuator 10a will be exemplified below, but the variable optical attenuator 10b also has the same configuration as the variable optical attenuator 10a.

As shown in FIGS. 2 to 4, the variable optical attenuator 10a includes a pair of mesas M provided on the substrate 2. Each of the mesas M extends along an optical waveguide. One mesa M is heated by the heater 12a. The other mesa M is heated by the heater 13a. In this embodiment, the energy supplied to the heater 13a is larger than the energy supplied to the heater 12a. Each of the heaters 12a and 13a is formed of a metallic layer such as a Pt/Ti layer, for example. The electrode pads Ea1 to Ea8, Ea10 to Ea14, Eb1 to Eb8, Eb10 to Eb14 are made of a material (e.g., Au) different from the material of the heaters 12a and 13a. The length L1 of the heater 13a along the optical waveguide is, for example, 200 µm to 400 µm.

The main surface 2s of the substrate 2 includes a first region R1 and a second region R2 adjacent to the first region R1. A mesa M is formed on the first region R1. A trench T is formed in the second region R2. In this embodiment, the first region R1 is disposed between a pair of the second regions R2. The depth of the trench T may be, for example, 2.5 µm or more, or may be 3.5 µm or less.

Each of the mesas M includes a semi-insulating semiconductor layer M2, a buffer layer M3, an insulating layer M4, a cladding layer M5, a core layer M6 (optical waveguide) and a cladding layer M7. The semi-insulating semiconductor layer M2, the buffer layer M3, the insulating layer M4, the cladding layer M5, the core layer M6, and the cladding layer M7 are provided in this order on the main surface 2s of the substrate 2. Thus, the insulating layer M4 is at least partially disposed between the substrate 2 and the core layer M6. The mesa M has a distal end portion and a base portion. The distal end portion of the mesa M includes the cladding layer M5, the core layer M6, and the cladding layer M7. The base portion of the mesa M includes the semi-insulating semiconductor layer M2, the buffer layer M3 and the insulating layer M4. The width D1 of the distal end portion of the mesa M is smaller than the width D1a of the base portion of the mesa M, and may be 2.5 µm, for example.

The substrate 2 is, for example, a semi-insulating group III-V compound semiconductor substrate such as a semi-insulating InP substrate. The semi-insulating semiconductor layer M2 is made of the same material as that of the substrate 2. The buffer layer M3 is, for example, an n-type group III-V compound semiconductor layer such as an n-InP layer. The insulating layer M4 is, for example, a group III-V compound semiconductor layer such as an i-AlInAs layer. The insulating layer M4 is, for example, an $Al_{0.48}In_{0.52}As$ layer. The thermal conductivity of the insulating layer M4 is lower than that of the core layer M6. The thermal conductivity of the insulating layer M4 may be 2 W/m·K or more and 6 W/m·k or less, and may be 5 W/m·K, for example. In this embodiment, the insulating layer M4 is filled with a heat insulating material, but the insulating layer M4 may be a void layer. The thickness of the insulating layer M4 may be, for example, 100 nm or more, or may be 300 nm or less. The cladding layer M5 is, for example, an n-type group III-V compound semiconducting layer such as an n-InP layer. The thickness of the cladding layer M5 may be 1 µm or more and 1.5 μm or less, and may be 1.0 μm for example. The core layer M6 is, for example, a group III-V compound semiconductor layer such as an i-GaInAsP layer. The thickness of the core layer M6 may be 0.3 μm or more and 0.6 μm or less, and may be 0.5 μm, for example. The cladding layer M7 is, for example, a group III-V compound semiconductor layer such as an i-InP layer. The thickness of the cladding layer M7 may be 1 μm or more and 1.5 μm or less, and may be 1.0 μm for example.

The variable optical attenuator 10a has an insulating film 9 covering the mesa M and the trench T. The insulating film 9 is, for example, a SiN film, a SiON film or a laminate thereof. The heater 13a is provided on the insulating film 9 above the mesa M. The heater 13a heats the core layer M6 together with the insulating film 9 and the cladding layers M7.

In the main surface 2s of the substrate 2, the semiconductor layer 3, the semiconductor layer 4, the semiconductor layer 5, the semiconductor layer 6 and the semiconductor layer 7 are provided in this order on the area where the mesa M and the trench T are not provided. The semiconductor layer 3, the semiconductor layer 4, the semiconductor layer 5, the semiconductor layer 6 and the semiconductor layer 7 are formed of the same materials as those of the buffer layer M3, the insulating layer M4, the cladding layer M5, the core layer M6 and the cladding layer M7, respectively. The semiconductor layer 8 may be provided on the semiconductor layer 7. The semiconductor layer 8 is, for example, a group III-V compound semiconductor layer such as a Fe-doped InP layer.

As shown in FIG. 4, the insulating layer M4 extends along the core layer M6 of the variable optical attenuator 10a and terminates between the variable optical attenuator 10a and the optical 90-degree hybrid device 20a. The optical 90-degree hybrid device 20a includes a semiconductor layer 5a instead of the insulating layer M4. The semiconductor layer 5a is formed of the same material as that of the semiconductor layer 5. The area BJ30 that defines butt-joint bonding includes a light absorption layer 6a, a semiconductor layer 7a, and a contact layer 7b instead of the semiconductor layer 6 and the semiconductor layer 7. The butt joint bonding is formed between an area including the semiconductor layer 6 and the semiconductor layer 7; and the area BJ30 including the light absorption layer 6a, the semiconductor layer 7a and the contact layer 7b. The light absorption layer 6a is, for example, a group III-V compound semiconducting layer such as a GaInAs layer. The semiconductor layer 7a is, for example, a p-type group III-V compound semiconductor layer such as a p-InP layer. The contact layer 7b is, for example, a p-type group III-V compound semiconducting layer such as a p-GaInAs layer. An anode electrode Ea1p is provided on the contact layers 7b. The anode electrode Ea1p is connected to the electrode pad Ea1 of FIG. 1. In the area BJ30, the semiconductor layer 5a, the semiconductor layer 5, the light absorption layer 6a, the semiconductor layer 7a and the contact layer 7b constitute a mesa having the same width D1 as that of the distal end portion of the mesa M, for example. The side surface of the mesa and a part of the surface of the semiconductor layer 3 are covered with a group III-V compound semiconductor layer such as a Fe-doped InP layer. A cathode electrode is provided on the remaining exposed portion of the surface of the semiconductor layer 3. The cathode electrode is connected to the electrode pad Ea5 of FIG. 1. In this manner, the photodiode 30a1 is formed in the area BJ30. The photodiodes 30a2 to 30a4, 30b to 30b4, 60a, 61a, 60b and 61b have the same configuration as that of the photodiode 30a1.

According to the photo detector 1 of the present embodiment, in the variable optical attenuator 10a, when the core layer M6 is heated by the heater 13a, heat transfer from the core layer M6 to the substrate 2 is suppressed by the insulating layer M4. Therefore, the energy (electric energy) supplied to the heater 13a in order to heat the core layer M6 can be reduced. Similarly in the variable optical attenuator 10b, it is possible to reduce the energy (electric energy) supplied to the heater 13b. The power consumption of the heaters 13a and 13b can be reduced to 50 mW or less, for example.

When the thickness of the insulating layer M4 is 300 nm or less, the possibility that the insulating layer M4 functions as a core layer differing from the core layer M6 can be reduced.

When the insulating layer M4 terminates between the variable optical attenuator 10a and the optical 90-degree hybrid device 20a, the insulating layer M4 is not placed between the substrate 2 and the optical 90-degree hybrid device 20a. Therefore, it is possible to suppress the deterioration of the heat dissipation from the optical 90-degree hybrid device 20a to the substrate 2. Similarly, when the insulating layer M4 terminates between the variable optical attenuator 10b and the optical 90-degree hybrid device 20b, the insulating layer M4 is not placed between the substrate 2 and optical 90-degree hybrid device 20b. Therefore, it is possible to suppress the deterioration of the heat dissipation from the optical 90-degree hybrid device 20b to the substrate 2. The transmission spectra of the optical 90-degree hybrid devices 20a and 20b shift with a change in temperature. For example, higher temperature shifts the transmission spectra to a longer wavelength at about 0.1 nm/° C., while lower temperature shifts the transmission spectra to a shorter wavelength at about 0.1 nm/° C. This is due to the temperature dependence of the refractive index. For example, when the temperature rises from 25° C. to 80° C., the transmittance of the optical 90-degree hybrid devices 20a and 20b decreases by about 0.2 dB at a wavelength of 1530 nm. As described above, the transmittance of the optical 90-degree hybrid devices 20a and 20b is easily changed by the temperature change. Therefore, when the heat dissipation from the optical 90-degree hybrid devices 20a and 20b to the substrate 2 can be satisfactorily maintained, the variation of the transmittance of the optical 90-degree hybrid devices 20a and 20b can be suppressed.

When the trench T is formed in the second region R2 on the main surface 2s of the substrate 2, as viewed from the normal direction of the main surface 2s of the substrate 2, the heat transfer from the first region R1 toward the second region R2 is suppressed by the trench T. Therefore, the energies supplied to the heaters 13a and 13b for heating the core layer M6 can be further reduced.

When the core layer M6 and the insulating layer M4 are included in the mesa M, the heat in the core layer M6 and the insulating layer M4 is confined within the mesa. Therefore, the energies supplied to the heaters 13a and 13b for heating the core layer M6 can be further reduced.

First Modification

Figure 5:
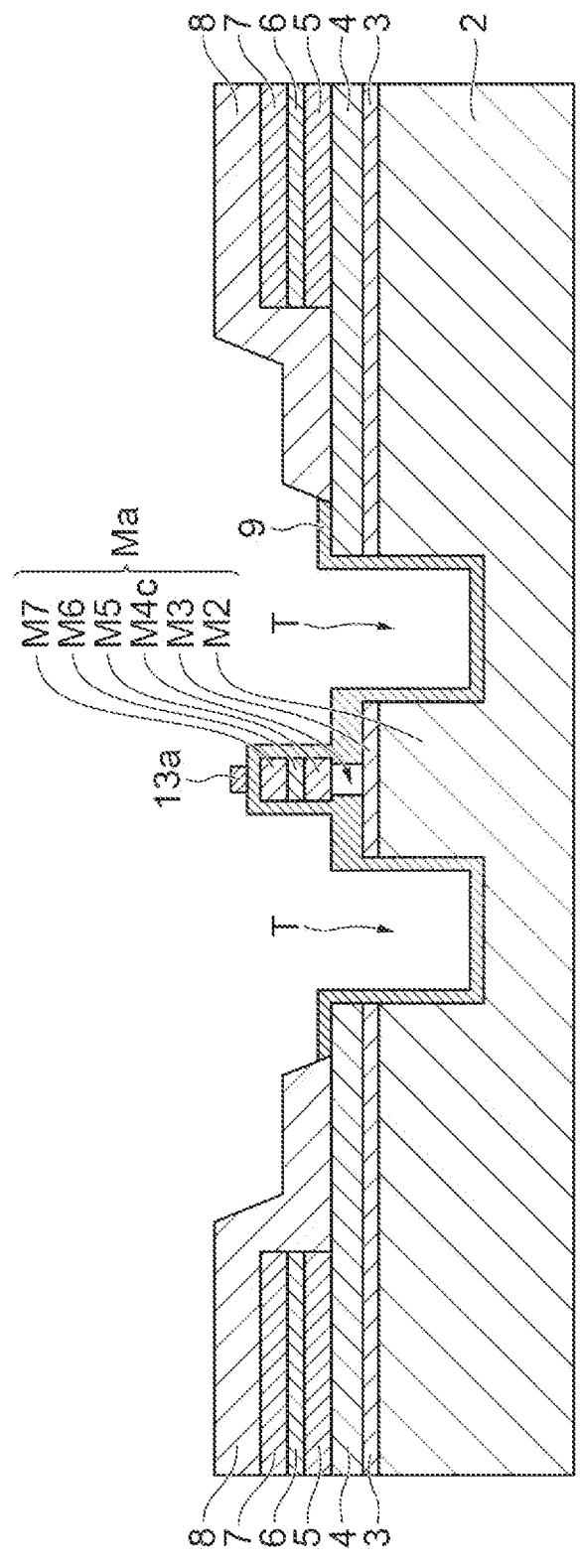
FIG. 5 is a cross-sectional view showing a photo detector according to a first modification.
Figure 6:
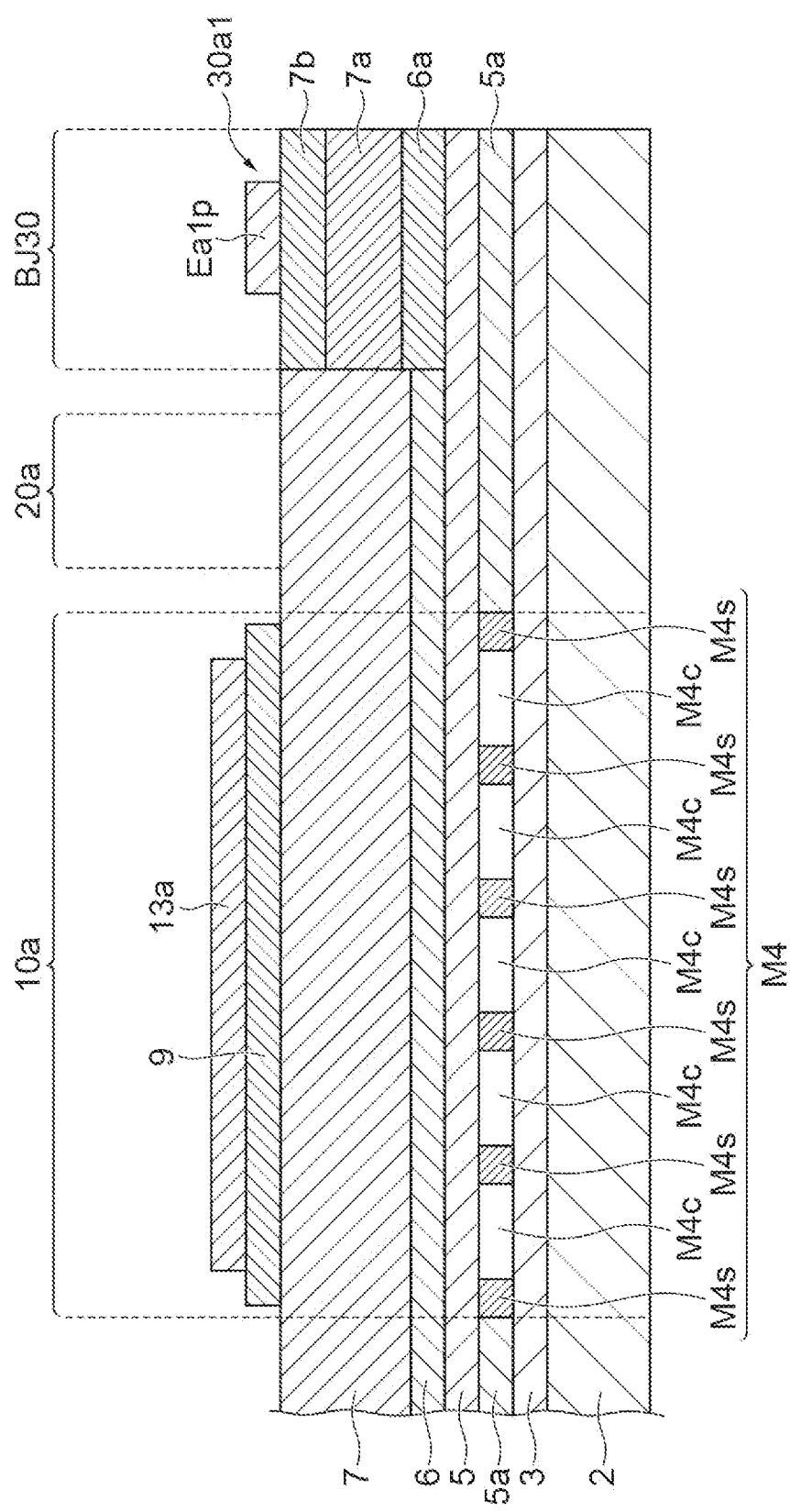
FIG. 6 is a cross-sectional view of a photo detector of FIG. 5 along an optical waveguide.

FIG. 5 is a cross-sectional view showing a photo detector according to a first modification. FIG. 6 is a cross-sectional view of the photo detector of FIG. 5 along an optical waveguide. The photo detector shown in FIGS. 5 and 6 has the same configuration as that of he photo detector 1 except that the insulating layer M4 contains semiconductor portions M4s and void portions M4c. In this modification, the semiconductor portions M4s and the void portions M4c are alternately arranged along the core layer M6. The semiconductor portion M4s has a columnar structure connecting the buffer layer M3 and the cladding layer M5. Each of the semiconductor portion M4s and the void portion M4c has, for example, a rectangular parallelepiped shape. The length of the semiconductor portion M4s along the optical waveguide is less than the length of the void portion M4c along the optical waveguide, and is less than half the length of the void portion M4c along the optical waveguide.

When the insulating layer M4 contains the semiconductor portion M4s, the core layer M6 can be physically supported by the semiconductor portion M4s. When the insulating layer M4 contains the void portion M4c, the thermal insulation of the insulating layer M4 is higher than the case in which the insulating layer M4 is filled with a thermal insulation (see FIG. 4). Therefore, the energies supplied to the heaters 13a and 13b for heating the core layer M6 can be further reduced. Further, when the insulating layer M4 contains the void portion M4c, the possibility that the insulating layer M4 functions as a core layer differing from the core layer M6 can be reduced. When the semiconductor portion M4s and the void portion M4c are alternately arranged along the core layer M6, the core layer M6 can be more stably supported by the semiconductor portion M4s.

Second Modification

Figure 7:
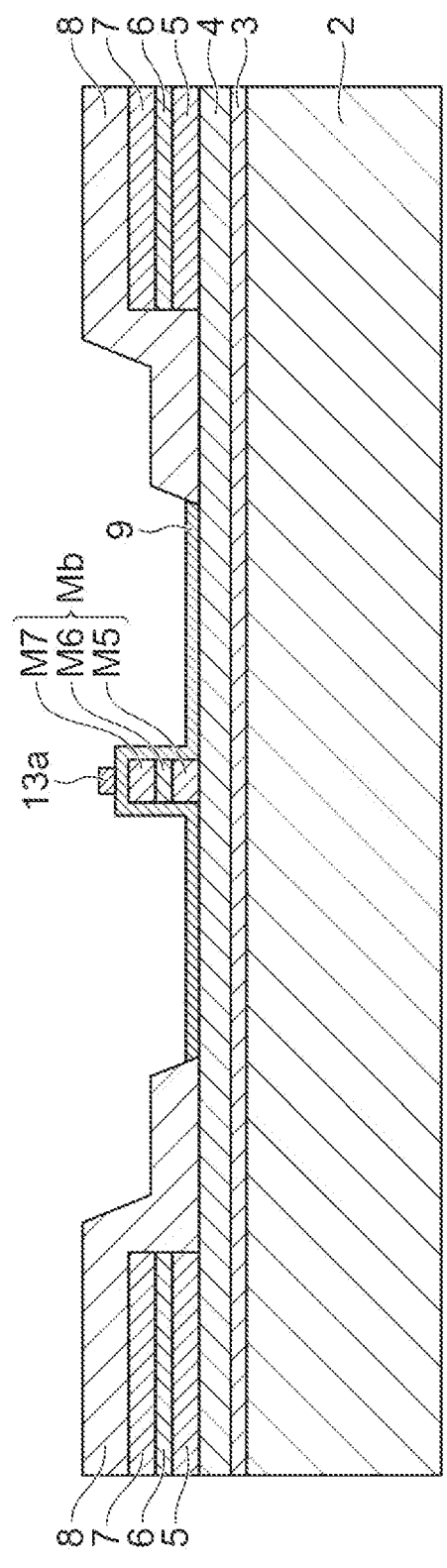
FIG. 7 is a cross-sectional view showing a photo detector according to a second modification.

FIG. 7 is a cross-sectional view showing a photo detector according to a second modification. The photo detector shown in FIG. 7 has the same configuration as that of the photo detector 1 except that no trenches T are formed. In this modification, a mesa Mb includes the cladding layer M5, the core layer M6, and the cladding layer M7. On the substrate 2, the semiconductor layer 3, the semiconductor layer 4 and the mesa Mb are provided in this order. Since the semiconductor layer 4 functions as an insulating layer, when the core layer M6 is heated by the heaters 13a and 13b, the heat transfer from the core layer M6 to the substrate 2 is suppressed by the semiconductor layer 4. Therefore, the energies supplied to the heaters 13a and 13b for heating the core layer M6 can be further reduced.

FIGS. 8A to 8D are drawings illustrating simulated models of a variable optical attenuator in a cross section perpendicular to an optical waveguide. FIG. 8A shows the model of the variable optical attenuator corresponding to the second modification. The width D1 of the mesa Mb is 2.5 µm. FIG. 8B shows the model corresponding to the variable optical attenuator 10a of the photo detector 1 (refer to FIG. 3). The width D1 of the distal end portion of the mesa M is 2.5 µm. The depth D2 of the trench T is 3 µm. The difference D3 between the outer periphery of the base portion of the mesa M and the outer periphery of the distal end portion of the mesa M is 1 µm. The width D4, which is wider than the total width of a pair of the trenches T and the mesa M by two times the distance D5, is 35 µm. The distance D5 from the end of the width D4 to the outer edge of the trench T is 1 µm. FIG. 8C shows the model with an increased trench T of the model shown in FIG. 8B. The width D1 of the mesa M is 2.5 µm. The depth D2 of the trench T is 3 µm. The total width D4 of a pair of the trenches T and the mesa M is 35 µm. FIG. 8D shows the model in which the width of the mesa M in the model shown in FIG. 8B is reduced. The width D6 of the mesa M is 1.5 µm. The depth D2 of the trench T is 3 µm. The total width D4 of a pair of the trenches T and the mesa M is 35 µm.

The substrate 2 is an InP substrate. The semiconductor layer 3, the semi-insulating semiconductor layer M2, and the buffer layer M3 are all InP layers. Both the semiconductor layer 4 and the insulating layer M4 are AlInAs layers each having a thickness of 1 µm. The cladding layer M5 and the cladding layer M7 are InP layers. The core layer M6 is an InGaAsP layer. The insulating film 9 is a SiN film. The heater 13a is formed of a Pt/Ti layer.

Figure 9A:
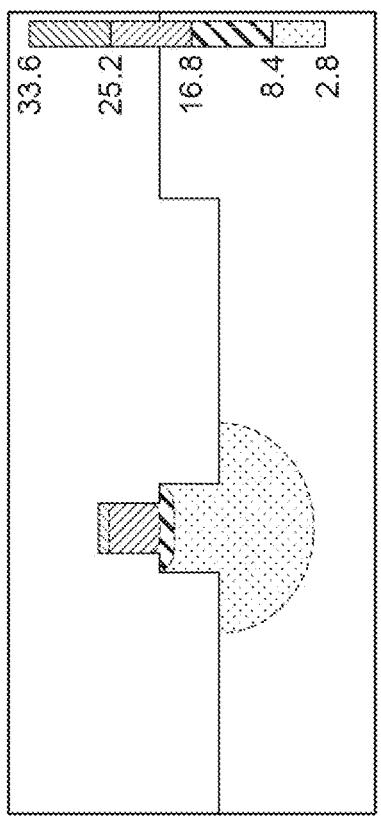
FIGS. 9A to 9D are drawings showing temperature profiles of a variable optical attenuator obtained by simulations.
Figure 9B:
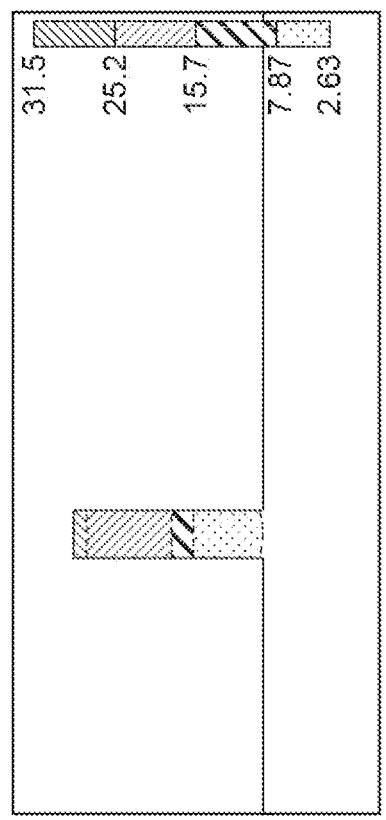
Figure 9C:
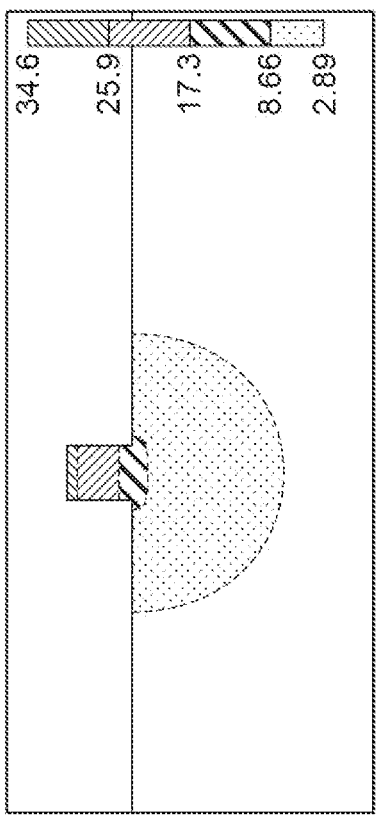
Figure 9D:
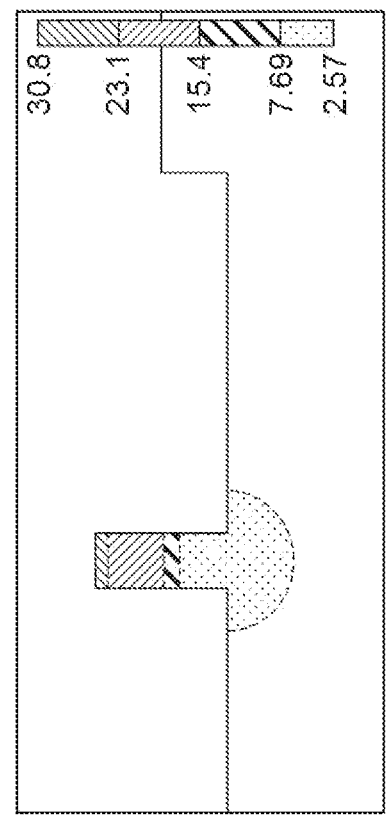

Temperature profiles were simulated for the models shown in FIGS. 8A to 8D. FIGS. 9A to 9D show the simulation results. FIGS. 9A to 9D are drawings showing the simulated temperature profiles of the variable optical attenuator. In the model shown in FIG. 8A, as shown in FIG. 9A, the maximum temperature (temperature of the heater 13a) is 34.6° C., and the power consumption of the heater 13a was 40.7 mW. In the model shown in FIG. 8B, as shown in FIG. 9B, the maximum temperature (temperature of the heater 13a) is 33.6° C., and the power consumption of the heater 13a was 38.0 mW. In the model shown in FIG. 8C, as shown in FIG. 9C, the maximum temperature (temperature of the heater 13a) is 30.8° C., and the power consumption of the heater 13a was 30.0 mW. In the model shown in FIG. 8D, as shown in FIG. 9D, the maximum temperature (temperature of the heater 13a) is 31.5° C., and the power consumption of the heater 13a is 19.2 mW. Therefore, in the model shown in FIG. 8D, the power consumption of the heater 13a is the lowest.

Method for Producing a Photo Detector

FIGS. 10A to 10C, 11A, and 11B are cross-sectional views of steps in a method for producing a photo detector according to an embodiment. A photo detector 1 of the above embodiment may be produced, for example, as follows.

Step of Forming a First Semiconductor Layer

Figure 10A:
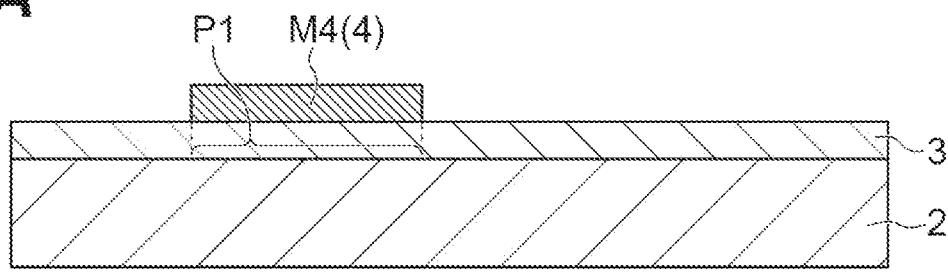
FIGS. 10A to 10C are cross-sectional views of steps in the method for producing a photo detector according to an embodiment.

First, as shown in FIG. 10A, a semiconductor layer 4 (first semiconductor layer) for an insulating layer M4 is formed on an area P1 for forming a variable optical attenuator 10a on a main surface 2s of a substrate 2. Prior to forming the semiconductor layer 4, a semiconductor layer 3 for a buffer layer M3 is formed on the main surface 2s of the substrate 2. Next, the semiconductor layer 4 is formed on the semiconductor layer 3 by photolithography and etching (wet etching), for example.

Step of Forming a Second Semiconductor Layer

Figure 10B:
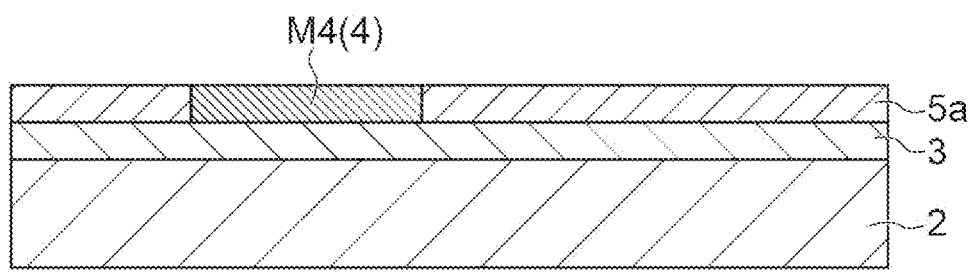
Figure 10C:
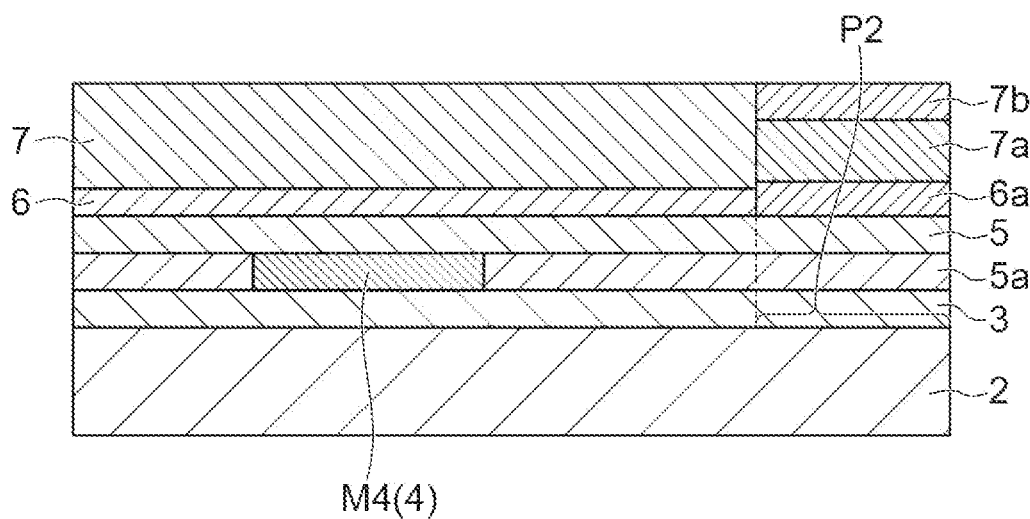

Next, as shown in FIGS. 10B and 10C, a semiconductor layer 6 (second semiconductor layer) for a core layer M6 of a variable optical attenuator 10a is formed on the semiconductor layer 4. Before forming the semiconductor layer 6, a mask is formed on the semiconductor layer 4. Using the mask, in an area of the main surface 2s of the substrate 2 except for the area P1, as shown in FIG. 10B, a semiconductor layer 5a is butt joint regrown on the semiconductor layer 3. Next, after removing the mask, as shown in FIG. 10C, a semiconductor layer 5 for a cladding layer M5 is formed on the semiconductor layer 4 and the semiconductor layer 5a.

Next, as shown in FIG. 10C, a light absorption layer 6a, a semiconductor layer 7a and a contact layer 7b are formed in this order on an area P2 by photolithography and etching (wet etching), for example. The area P2 is an area for forming photodiodes 30a1 to 30a4, 30b1 to 30b4 on the main surface 2s of the substrate 2.

Next, another mask is formed on the area P2. Using the mask, in an area of the main surface 2s of the substrate 2 excluding the area P2, as shown in FIG. 10C, the semiconductor layer 6 and the semiconductor layer 7 are butt joint regrown on the semiconductor layer 5. Thereafter, the mask is removed.

Step for Forming a Mesa and a Trench

Figure 11A:
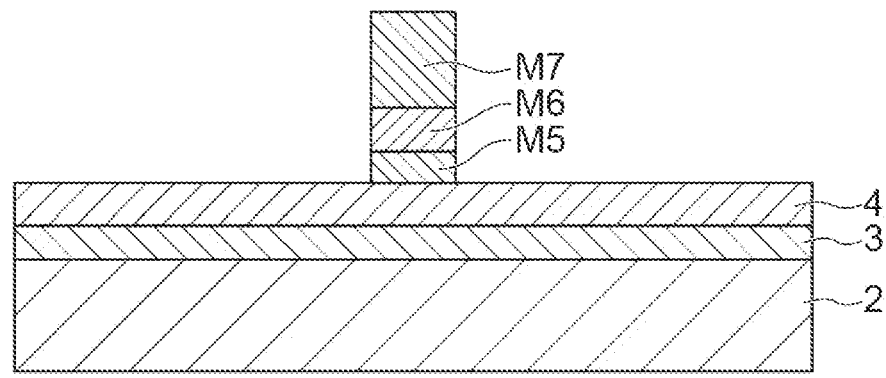
FIGS. 11A and 11B are cross-sectional views of steps in the method for producing a photo detector according to an embodiment.
Figure 11B:
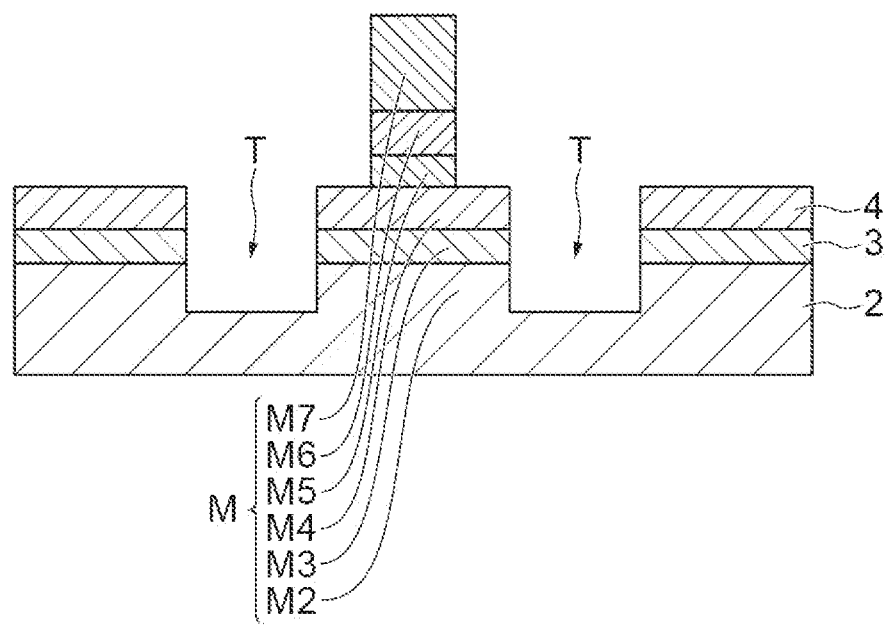

Next, as shown in FIGS. 11A and 11B, for example, by photolithography and etching (dry etching), a mesa M and a trench T are formed. For example, as shown in FIG. 11A, first, the semiconductor layer 7, the semiconductor layer 6, and the semiconductor layer 5 are etched to form a distal end portion of the mesa M (i.e., cladding layer M5, core layer M6, and cladding layer M7). At this time, by etching the contact layer 7b, the semiconductor layer 7a, the light absorption layer 6a, the semiconductor layer 5 and the semiconductor layer 5a, the mesas for the photodiodes 30a1 to 30a4, 30b to 30b4 are also formed at the same time. Thereafter, a mask (e.g., insulating film) covering areas other than the areas where the photodiodes 30a1 to 30a4 and 30b1 to 30b4 and spot-size converters 40a to 40c are to be formed is used to form a group III-V compound semiconductor layer such as a Fe-doped InP layer. By the above process, the mesas for the photodiodes 30a1 to 30a4 and 30b1 to 30b4 are embedded, and the spot-size converter 40a to 40c are formed. Thereafter, the mask is removed.

Subsequently, as shown in FIG. 11B, in the areas where the variable optical attenuators 10a and 10b are formed, the trenches T and the base portion of the mesa M are formed by etching the semiconductor layer 4, the semiconductor layer 3 and the substrate 2 using photolithography and etching (dry etching), for example.

Step of Forming a Heater

Next, as shown in FIGS. 2 to 4, heaters 12a, 12b, 13a, and 13b are formed on the semiconductor layer 6. For example, first, the insulating film 9 is formed on the cladding layer M7 in the areas where the variable optical attenuators 10a and 10b are formed. The insulating film 9 is formed so as to cover the trenches T and the mesa M. Next, the heater 12a, 12b, 13a, and 13b are formed on the insulating film 9 by lift-off, for example. Thereafter, cathode and anode electrodes of photodiodes, electrode pads, and the like are formed.

According to the method for producing the photo detector 1 described above, the insulating layer M4 at least partially disposed between the core layer M6 of the variable optical attenuators 10a and 10b and the substrate 2 can be formed.

Figure 12A:
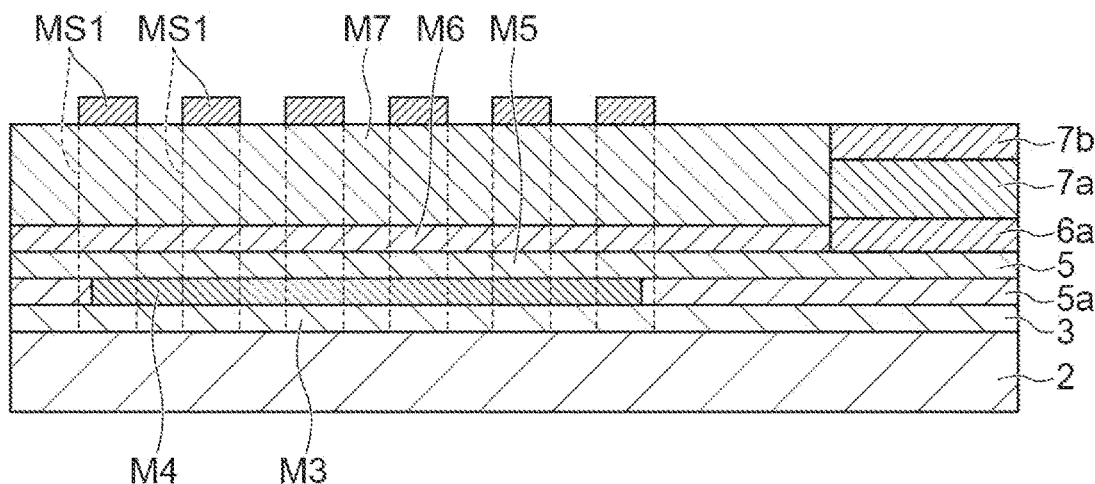
FIGS. 12A and 12B are cross-sectional views of steps in the method for producing a photo detector according to a first modification.
Figure 12B:
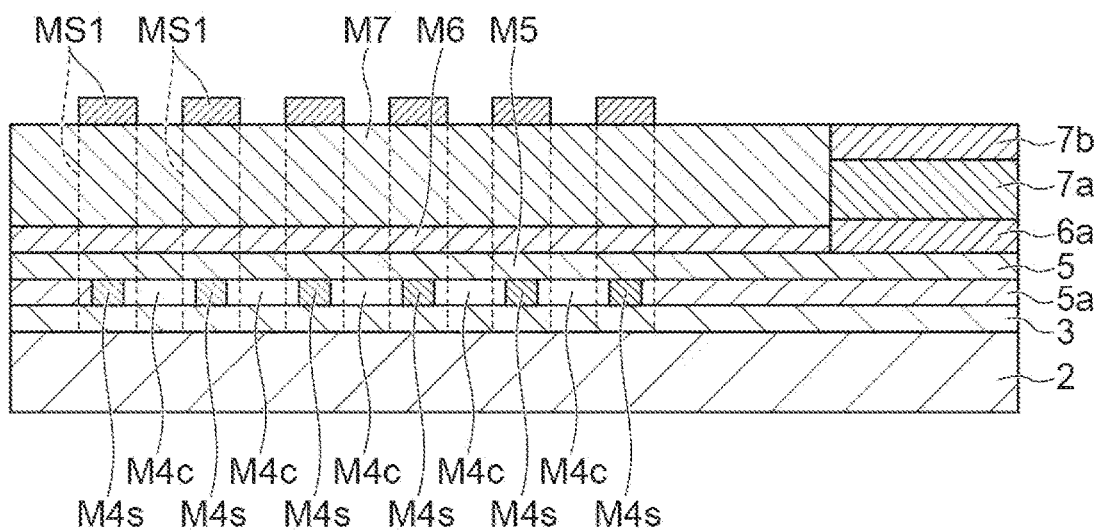

FIGS. 12A and 12B are cross-sectional views of the steps in the method of the photo detector according to the first modification. The photo detector according to the first modification (see FIGS. 5 and 6) may be produced in the following manner, for example.

In the present modification, the following steps are performed between the step of forming the mesa and the trench and the step of forming the heaters. First, as shown in FIG. 12A, after the mesa M and the trench T are formed, a stripe-shaped mask MS1 extending in the direction crossing an optical waveguide is formed on the mesa M and the trench T. Thereafter, as shown in FIG. 12B, the insulating layer M4 is wet-etched using the mask MS1. As a result, semiconductor portions M4s and void portions M4c alternately arranged along the core layer M6 are formed. Thereafter, after removing the mask MS1, the insulating film 9 and the heaters 12a, 12b, 13a, and 13b are formed.

The photo detector according to the second modification (see FIG. 7) may be produced by forming the insulating film 9 and the heaters 12a, 12b, 13a, and 13b without forming the base portion of the mesa M and the trench T after removing the mask in the step of forming the mesa and the trench described above.

The embodiments of the present disclosure have been described above. However, the embodiments of the present disclosure disclosed above are only illustrative, and the scope of the present invention is not limited to the specific embodiments of the disclosure. It is to be understood that the scope of the present invention is defined in the appended claims and includes equivalence of the description of the claims and all changes within the scope of the claims.

For example, a trench T may not be formed in the first modification. In this instance, a semi-insulating semiconductor layer M2 and a buffer layer M3 are not included in a mesa Ma. That is, in the second modification, a semiconductor layer 4 may be replaced with an insulating layer M4. The insulating layer M4 is then included in a mesa Mb.

While the principles of the present invention have been illustrated and described in preferred embodiments, it will be appreciated by those skilled in the art that the invention may be modified in arrangement and detail without departing from such principles. The present invention is not limited to the specific configurations disclosed in this embodiment. Accordingly, it is claimed that all modifications and changes come from the scope of the claims and their spirit.

What is claimed is:

1. A photo detector comprising:
   a variable optical attenuator provided on a substrate;
   an optical 90-degree hybrid device provided on the substrate; and
   a plurality of photodiodes provided on the substrate,
   wherein the plurality of photodiodes are optically coupled to the variable optical attenuator via the optical 90-degree hybrid device,
   wherein the variable optical attenuator includes an optical waveguide provided on the substrate, a heater configured to heat the optical waveguide, and an insulating layer at least partially disposed between the substrate and the optical waveguide,
   wherein the insulating layer includes a semiconductor portion and a void portion, and
   wherein the semiconductor portion and the void portion are alternately arranged along the optical waveguide.

2. The photo detector according to claim 1, wherein a thickness of the insulating layer is 300 nm or less.

3. The photo detector according to claim 1, wherein the insulating layer extends along the optical waveguide and terminates between the variable optical attenuator and the optical 90-degree hybrid device.

4. The photo detector according to claim 1, wherein
   the substrate comprises a main surface including a first region and a second region adjacent to the first region,
   the optical waveguide is provided on the first region, and
   a trench is formed in the second region.

5. The photo detector according to claim 1, wherein the optical waveguide and the insulating layer are included in a mesa provided on the substrate.

6. The photo detector according to claim 1, wherein the insulating layer has a thermal conductivity of 6 W/m·K or less.

7. The photo detector according to claim 1, wherein the insulating layer comprises AlInAs.

8. The photo detector according to claim 1, further comprising:
   a first cladding layer disposed between the optical waveguide and the insulating layer; and
   a second cladding layer disposed between the optical waveguide and the heater.

9. The photo detector according to claim 1, wherein a length of the semiconductor portion along the optical waveguide is less than a length of the void portion along the optical waveguide.

10. The photo detector according to claim 9, wherein the length of the semiconductor portion along the optical waveguide is less than half the length of the void portion along the optical waveguide.

11. A method for producing a photo detector including a variable optical attenuator provided on a substrate, an optical 90-degree hybrid device provided on the substrate, and a plurality of photodiodes provided on the substrate, the plurality of photodiodes being optically coupled to the variable optical attenuator via the optical 90-degree hybrid device, the method comprising:
- forming a first semiconductor layer on an area of a main surface of the substrate for forming the variable optical attenuator;
- forming a second semiconductor layer on the first semiconductor layer, the second semiconductor layer providing an optical waveguide for the variable optical attenuator; and
- forming a heater configured to heat the optical waveguide on the second semiconductor layer,
- wherein, between the forming of the second insulating layer and the forming of the heater, the first semiconductor layer is etched to provide an insulating layer including at least one semiconductor portion and at least one void portion, each semiconductor portion and each void portion being arranged alternately along the optical waveguide.

12. The method for producing a photo detector according to claim 11, wherein a thickness of the insulating layer is 300 nm or less.

13. The method for producing a photo detector according to claim 11, wherein the insulating layer is formed to extend along the optical waveguide and terminate between the variable optical attenuator and the optical 90-degree hybrid device.

14. The method for producing a photo detector according to claim 11, wherein the substrate comprises a main surface including a first region and a second region adjacent to the first region, the optical waveguide being provided on the first region, and a trench being formed in the second region.

15. The method for producing a photo detector according to claim 11, wherein the insulating layer is provided to have a thermal conductivity of 6 W/m·K or less.

16. The method for producing a photo detector according to claim 11, wherein a length of the at least one semiconductor portion along the optical waveguide is less than a length of the at least one void portion along the optical waveguide.

17. The method for producing a photo detector according to claim 16, wherein the length of the at least one semiconductor portion along the optical waveguide is less than half the length of the at least one void portion along the optical waveguide.

* * * * *